US009473548B1

(12) United States Patent
Chakrovorthy et al.

(10) Patent No.: US 9,473,548 B1
(45) Date of Patent: Oct. 18, 2016

(54) LATENCY REDUCTION IN STREAMED CONTENT CONSUMPTION

(71) Applicant: AMAZON TECHNOLOGIES, INC, Reno, NV (US)

(72) Inventors: Sreeram Raju Chakrovorthy, Campbell, CA (US); Sapna Jayaram Rai, Campbell, CA (US)

(73) Assignee: Amazon Technologies, Inc., Reno, NV (US)

( * ) Notice: Subject to any disclaimer, the term of this patent is extended or adjusted under 35 U.S.C. 154(b) by 224 days.

(21) Appl. No.: 13/797,323

(22) Filed: Mar. 12, 2013

(51) Int. Cl.
*H04L 29/06* (2006.01)
*H04N 21/47* (2011.01)
*H04N 21/472* (2011.01)

(52) U.S. Cl.
CPC .......... *H04L 65/60* (2013.01); *H04L 65/4069* (2013.01); *H04L 65/4084* (2013.01); *H04L 65/4092* (2013.01); *H04N 21/47* (2013.01); *H04N 21/472* (2013.01)

(58) Field of Classification Search
CPC .............. H04L 65/4084; H04L 21/47; H04L 21/47205
See application file for complete search history.

(56) References Cited

U.S. PATENT DOCUMENTS

| 8,001,143 | B1* | 8/2011 | Gupta | G06F 17/30038 345/614 |
| 2002/0075572 | A1* | 6/2002 | Boreczky | H04N 7/17336 359/722 |
| 2006/0173838 | A1* | 8/2006 | Garg | G06Q 30/02 |
| 2010/0095317 | A1* | 4/2010 | Toebes | H04N 7/163 725/9 |
| 2010/0262911 | A1* | 10/2010 | Kaplan | G11B 27/034 715/719 |
| 2012/0093476 | A1* | 4/2012 | Mountain | H04N 21/4312 386/230 |

* cited by examiner

*Primary Examiner* — Jeong S Park
(74) *Attorney, Agent, or Firm* — Lindauer Law, PLLC

(57) ABSTRACT

Described herein are systems and methods for determining and distributing pre-fetch data associated with streaming of content to a media device. Transport control data associated with user navigation within the content during consumption of the content is acquired. The transport control data is processed to determine one or more points of interest in the content. Pre-fetch content associated with these one or more points of interest may be delivered to the media device. Presentation is expedited with low or no latency during navigation to one of the points of interest having the pre-fetched content, which may be presented while the content is being made available.

20 Claims, 8 Drawing Sheets

LATENCY REDUCTION IN STREAMED CONTENT CONSUMPTION

BACKGROUND

A wide variety of content is available for streaming delivery to media devices for presentation. The content may include audio, video, or both. The media devices may include televisions, tablet computers, personal computers, gaming consoles, in-vehicle entertainment systems, portable media players, and so forth. The media devices may be configured to provide user interfaces allowing a user to navigate through the content.

Traditionally navigation to another point in time in the streamed content may result in the user experiencing delays in subsequent presentation while the content for that point in time is received. These delays may result in an undesirable user experience.

Figure 1:
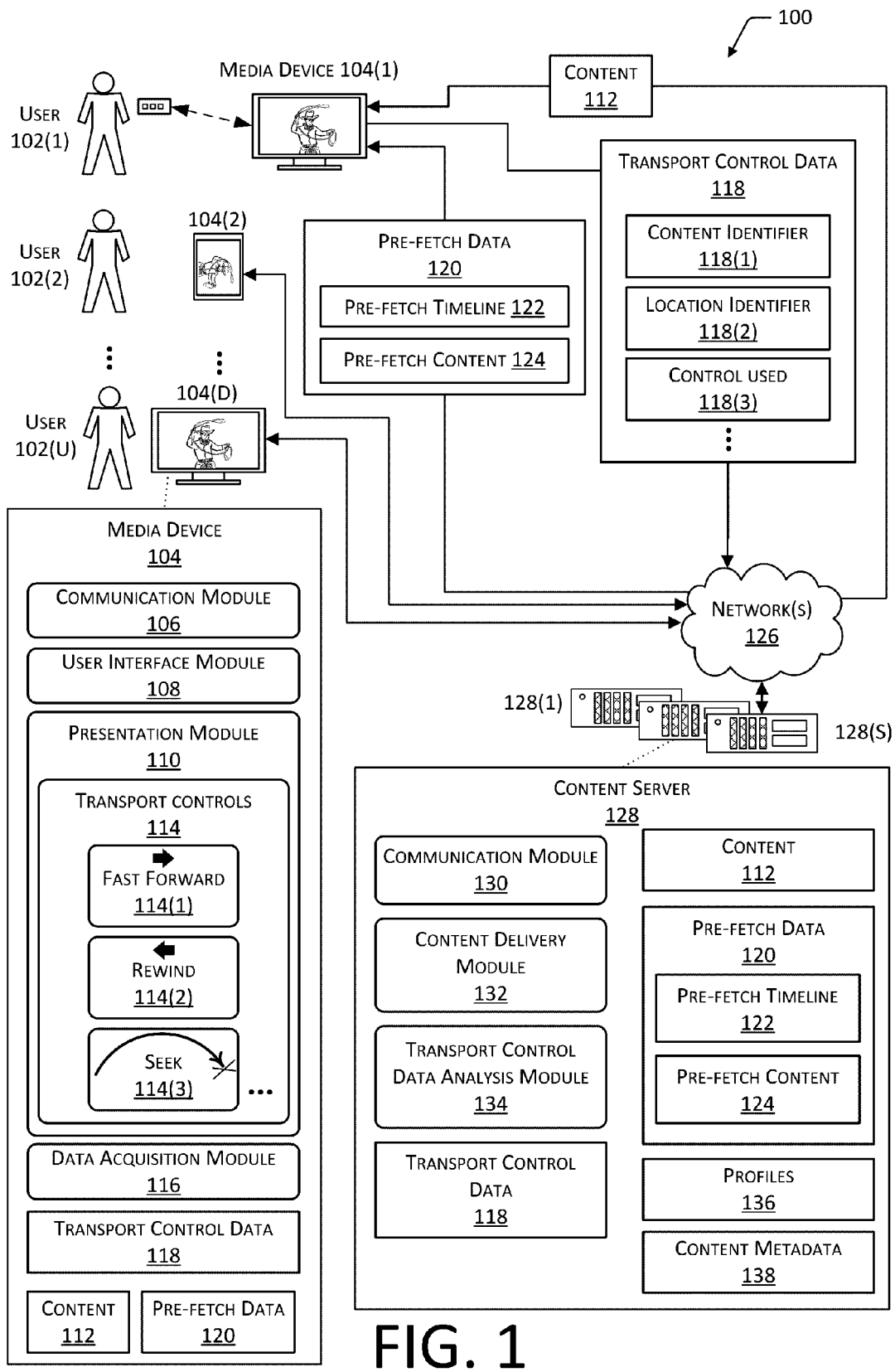
FIG. 1 is an illustrative system for latency reduction in streamed content consumption using pre-fetched data based at least in part on transport control data input received from a plurality of users.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media devices present content to one or more users. The content may include audio, video, or both. For example, the content may include television shows, movies, audio books, and so forth.

The content may be streamed from one or more content servers to the media device. The media device may then present the content to the one or more users. Streaming comprises an incremental ongoing transmission of portions of the content. That is, the content is delivered in portions, such as blocks or chunks of data, which are transmitted over time. As the portions are received, presentation may take place. Streaming allows for presentation to begin before the entire file has been downloaded. Streaming offers several advantages compared to local storage of the entire file of the content. Local storage requirements of the media device are reduced, lowering cost of the device. Content publishers or owners may be better able to determine content consumption statistics such as how many times a movie has been watched. Digital rights management may also be more easily applied and updated, helping to maintain intellectual property rights in the content.

Streaming utilizes a connection to the one or more content servers to receive portions of the content for presentation. To reduce adverse user experiences associated with changes in network conditions, a portion of the content may be received and buffered prior to presentation. Buffering or other operations such as establishment of digital rights management permissions may introduce a delay which is perceptible to the user while the buffer fills.

During straight-through play from a beginning time to an ending time in the content, the user may experience a delay once, such as after initiation of the presentation. During presentation of the content, the user may activate one or more transport controls to navigate within the content. These transport controls may include fast forward, rewind, seek, and so forth. Activation of the transport controls changes the point in time in the content at which presentation occurs. For example, the user may activate the transport control to fast forward to a point in the content 23 seconds from a current position in the content.

Due to the ongoing delivery aspect of streaming, the user may navigate to a point in time in the content beyond which portions of the content have been received, or which have already been discarded from storage. This may result in a delay while content associated with that point in time is retrieved from the one or more servers. Other factors may also introduce delays, such as Digital Rights Management (DRM) checks and so forth.

Described in this disclosure are systems and techniques for reducing or eliminating the latency in presentation associated with navigation to different points in time in the content. Transport control data from a plurality of users interacting with the same or a similar piece of content is acquired and analyzed to develop pre-fetch data. This pre-fetch data may include a pre-fetch timeline and pre-fetch content. The pre-fetch timeline comprises points of interest in the content, and pre-fetch content may include clips associated with those points of interest. The pre-fetch data may vary between users. Profiles may be used to develop pre-fetch data tailored to a particular user or group of users.

During presentation of the content for which pre-fetch data is available, the user may activate a transport control to navigate within the content. Navigation may be provided to one of the points of interest in the pre-fetch timeline. When selected for presentation, the pre-fetch content associated with the point of interest is presented while the content associated with that point of interest is streamed and prepared for presentation. Using this technique the user may navigate within the content and quickly see content for those pre-fetched points of interest with little or no latency in the presentation.

Illustrative System

FIG. 1 is an illustrative system 100 for latency reduction in streamed content consumption. A plurality of users 102(1), 102(2), . . . , 102(U) are depicted with corresponding media devices 104(1), 104(2), . . . , 104(D) to present content for consumption. While a single user 102 is shown at each of the media devices 104, more than one user 102 may consume the content at a given time, such as where multiple users are watching the presented content together.

The media device 104 may include televisions, tablet computers, personal computers, gaming consoles, in-vehicle entertainment systems, portable media players, and so forth. The media devices 104 depicted include displays and are presenting video content.

The media device 104 comprises a communication module 106 configured to establish and support communications between the media device 104 and other devices. For example, the communication module 106 may execute instructions which support transmission of data across a data network using the transmission control protocol/internet protocol ("TCP/IP").

A user interface module 108 of the media device 104 is configured to provide a user interface to the user 102 and accept inputs responsive to the user interface. The user interface may include one or more visual, audible, or haptic elements. For example, the user interface may be configured to provide a graphical user interface using the display which includes a control to navigate within the content. The user interface is described in more detail below with regard to FIG. 2.

The presentation module 110 is configured to present content 112 on, or in conjunction with, the media device 104. The presentation module 110 may be configured to receive streamed content 112 from an external source device such as a server, or may access content which has been previously stored on the media device 104. The presentation module 110 may support digital rights management, presentation of encrypted content, and so forth. The presentation module 110 may be configured to work in conjunction with the user interface module 108 to allow the user 102 to select a point within the content 112 for presentation.

The presentation module 110 is configured to support one or more transport controls 114. The transport controls 114 are configured such that, when activated, presentation of the content 112 may be shifted to a different point in time in the content 112. In the example illustrated here, the transport controls include a fast forward 114(1) control, a rewind 114(2) control, and a seek control 114(3). In other implementations other transport controls may be provided such as scrubbing, jumping, and so forth. These controls may be implemented as physical buttons, such as on a remote control device in communication with the media device 104, virtual or "soft" buttons or features presented in the user interface such as provided by the user interface module 108, verbal commands recognized by a machine such as using speech recognition, gestures received by a camera, and so forth.

A data acquisition module 116 on the media device 104 is configured to acquire transport control data 118. The transport control data 118 may be associated with a single user 102, or a plurality of the users 102, and may be based on user input to the plurality of the media devices 104. The data acquisition module 116 may work in conjunction with other modules, such as the communication module 106, the user interface module 108, and the presentation module 110.

The transport control data 118 may include one or more data elements such as a content identifier 118(1), a location identifier 118(2), a control used 118(3), and so forth. The content identifier 118(1) includes information which identifies or designates the particular content 112 which is being presented. For example, the content identifier 118(1) may be a string such as a product identification number indicating a particular movie as stored by a content provider. In some implementations the content identifier information 118(1) may be inferred or determined based on other connection data. For example, a single stream of content 112 may be delivered to the media device 104 during a period of time. The transport control data 118 also gathered during that period of time may be associated with the particular piece of content 112. The location identifier 118(2) provides information as to a point in time or otherwise within the content 112 the user has navigated to. The location identifier 118(2) may be expressed as a time, byte count, frame count, and so forth. The location identifier 118(2) may be measured from the start of the content 112, or until the end of the content 112. For example, the location identifier 118(2) may indicate the location as 00:26 (minutes:seconds) or as frame 624. The control used 118(3) indicates which of the transport controls 114 were activated during the navigation. For example, the control used 118(3) may have been a button on a remote control, selection from a timeline presented in the user interface, and so forth. In some implementations, different weights may be assigned to different controls used. For example, user input from a button on a remote control may be deemed more accurate and of higher importance than a spoken command.

The data acquisition module 116 may be configured to process the input received. The processing may include filtering or removing transport control data 118. The filtered or removed data may be transport control data 118 which occurs within a particular period of time or window, while retaining a first or last piece of transport control data 118. For example, the user 102 may use the fast forward transport control 114(1) to move through the content 112, stopping briefly eight times in a twenty-second span of time while trying to find a particular point in the content 112. The data acquisition module 116 may be configured to disregard or remove the seven brief stops, and provide transport control data 118 for the final point in the content 112 associated with the last stop.

The media device 104 may also store at least a portion of pre-fetch data 120. The pre-fetch data 120 may include a pre-fetch timeline 122, pre-fetch content 124, or both. The pre-fetch timeline 122 indicates one or more points of interest within the content 112 which have been determined based at least in part on the transport control data 118 as described below. In some implementations, the pre-fetch timeline 122 may have the points of interest arranged sequentially by time, or may have data which designates a sequence of time. The pre-fetch content 124 comprises data such as clips associated with the one or more points of interest which are indicated within the pre-fetch timeline 122. The pre-fetch content 124 may be presented by the media device 104 while presentation of the content 112 is prepared after navigation to a different point in the content 112. The pre-fetch data 120 is discussed in more detail below with regard to FIG. 2.

The media device 104 may be coupled to a remote control using a communication link. The remote control may serve as an input device or input/output device for the media device 104. For example, the remote control may include one or more of a touch sensor, button, accelerometer, gyroscope, camera, microphone, speaker, haptic output device, and so forth. The communication link may be optical, radio frequency, acoustic, and so forth. In one implementation the communication link may use a personal area network interface, such as one compliant with the Bluetooth® specification. In some implementations the remote control may comprise another device such as a smartphone, tablet computer, and so forth which is communicatively coupled to the media device 104.

The media device 104 may couple to one or more networks 126 which are configured to transfer data between devices. The networks 126 may include one or more public networks such as the Internet, private networks, or a combination of both. The network 126 in turn couples to a plurality of content servers 128(1), 128(2), . . . , 128(S).

While single servers 128 are depicted, in some implementations the servers 128 or the functions attributed to the servers 128 may be provided by a plurality of devices. For example, the server 128 may exist as a virtualized server executing across a plurality of physical servers.

The content server 128 may provide functions such as streaming content 112 to the media device 104 for presentation, generating and providing pre-fetch data 120, acquiring authenticating user accounts, providing content lists, and so forth. The content server 128 may store, or have access to, one or more pieces of content 112. The content 112 may include audio, video, and so forth. The content 112 may be provided using the network 126 to the media device 104. The presentation module 110 of the media device 104 may receive the content 126 and present it to the user 102.

The content server 128 may include a communication module 130 configured to establish and support communications with the media device 104 or other devices. A content delivery module 132 is configured to stream the content 112 to one or more of the media devices 104. The streaming of the content 112 may be initiated by a request from the media device 104, or by the content server 128 or another device.

A transport control data analysis module 134 is configured to acquire the transport control data 118 from a plurality of media devices 104. The content server 128 may directly acquire this information, such as receiving it from the plurality of the media devices 104, or may receive the data from another device such as an aggregation server. In some implementations the transport control data analysis module 134 may acquire the transport control data 118 from interactions between the media device 104 and the content server 128. For example, the content server 128 may log data indicating when the stream of the content 112 deviates from linear playback and is resumed at a different point in the content 112. This log data may then be used to generate the transport control data 118, such as the content identifier 118(1) and the location identifier 118(2) data.

The transport control data analysis module 134 may be configured to generate the pre-fetch data 120 based at least in part on the transport control data 118. The transport control data 118 is processed to determine one or more points of interest. The points of interest comprise locations within the content 112 which the user 102 is likely to navigate to. The points of interest may be determined by evaluating the transport control data 118 with one or more of probability distributions, heuristics, machine learning techniques, and so forth. These points of interest may then be used to generate the pre-fetch timeline 122.

The transport control data analysis module 134 may be configured to select particularly relevant pieces of transport control data 118 for analysis. For example, filters may be applied which disregard transport control data 118 which is repetitive, duplicative, part of a repeated series of inputs, and so forth. For example, the user 102 may use the rewind transport control 114(2) to step back through the content 112, stopping occasionally to determine if a particular point of interest has been found. The transport control data 118 associated with the time in the content 112 at which the user 102 resumes normal presentation may be used for analysis, while the earlier stops along the way may be disregarded.

One or more profiles 136 may be used in the generation of the pre-fetch data 120. The profiles 136 may be used to customize or tailor the pre-fetch data 120 to particular users 102 or groups of users. This customization may include filtering data to users 102 with the same or similar demographics, adjusting the probability distribution, and so forth. The profiles 136 are discussed in more detail below with regard to FIG. 4.

During operation, the media device 104 receives the content 112 stream and at least a portion of the pre-fetch data 120. The delivery of the pre-fetch data 120 and portions thereof may be coordinated with a current presentation position in the content 112. For example, a portion of the pre-fetch data 120 associated with 5 minutes before and after the current presentation point may be sent to the media device 104. As the content 112 continues to be streamed and presented, additional portions of the pre-fetch data 120 may be delivered to maintain availability of the pre-fetch content 124 for 5 minutes before and after the current presentation point. Should the user 102 not use the transport controls 114, the content 112 would continue to play as usual. Upon accessing the transport controls 114 the user 102 may select a point of interest in the pre-fetch timeline 122 which has associated pre-fetch content 124. Once selected, presentation may begin promptly using the pre-fetched content 124 while the stream of the content 112 from the content server 128 is updated to reflect the new location in time in the content 112.

The content servers 128 may also store content metadata 138. The content metadata 138 comprises information about the content 112. This may include cast, crew, performers, listing of songs, scene listing, indexing data, closed captioning, and so forth. The content metadata 138 may be provided along with the content 112 to the content server 128, or may be generated at least in part by the content server 128. For example, during intake of the content 112 data in the closed captioning may be analyzed to determine portions of the content 112 which may designated as points of interest. In another example, during production of the content 112, content metadata 138 may be generated, which includes maturity ratings for particular scenes.

Figure 2:
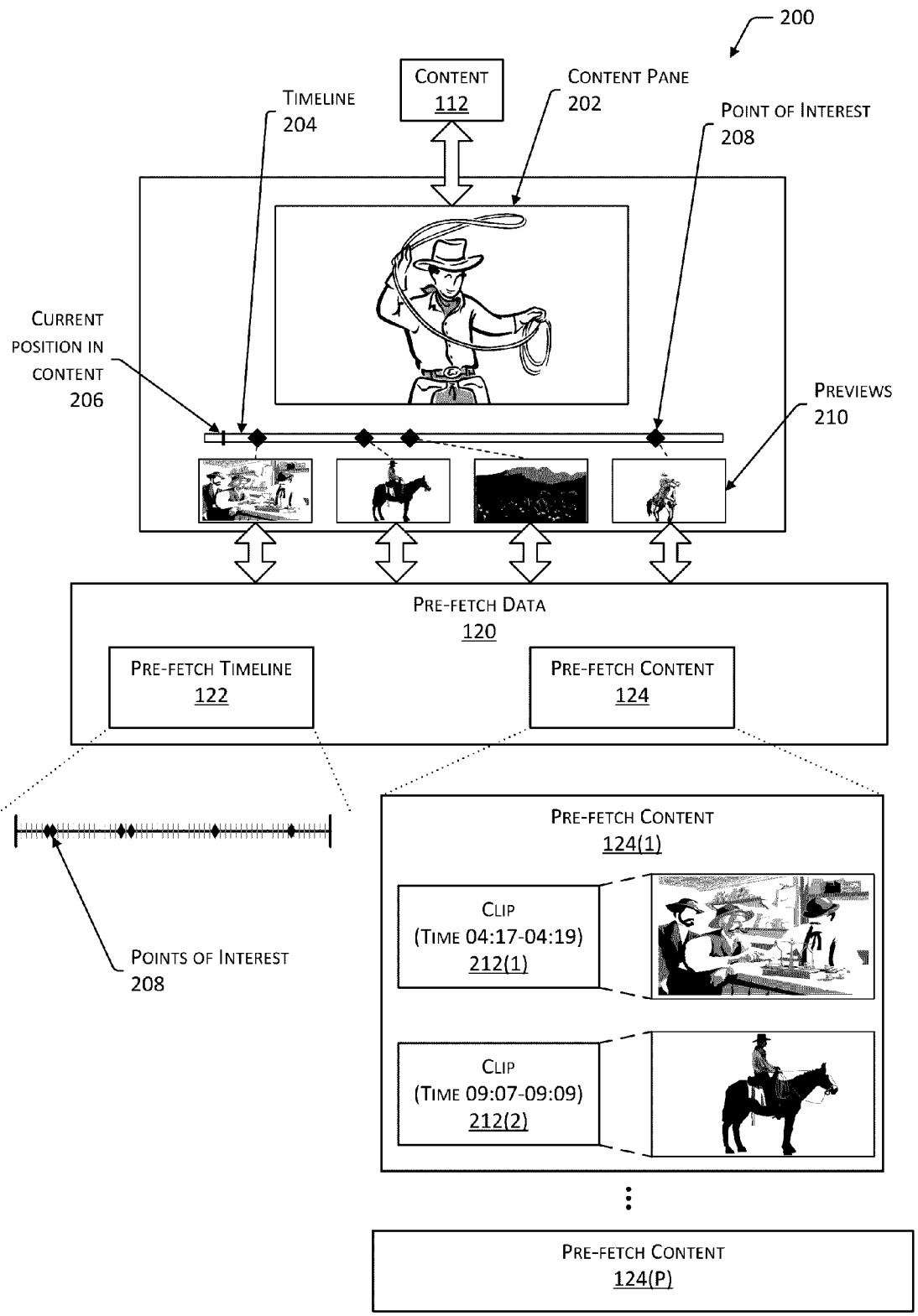
FIG. 2 illustrates a user interface in which a user is navigating to different points of interest in the content and the associated pre-fetch data for those points.

FIG. 2 illustrates a user interface 200 in which the user 102 is navigating within the content 112. In one implementation, this user interface may be maintained at least in part by the user interface module 108 of the media device 104.

In this illustration a content pane 202 is depicted, within which at least a portion of the content 112 which has a visual component may be shown. For example, as shown here, a portion of the movie "Burnt Sage" is depicted in the content pane 202. A timeline 204 is depicted, which is based at least in part on the pre-fetch timeline 122. A current position in the content 206 is depicted as a black rectangle icon on the timeline 204. This is the current position within the content 112 and corresponds to the information currently being presented by the media device 104, such as the image in the content pane 202. As presentation continues, the current position in the content 206 indicator will progress, such as from left to right in this illustration.

This timeline includes a plurality of points of interest 208, indicated here with black diamond icons. The points of interest 208 comprise locations within the content 112 which the user 102 is likely to navigate to, based at least in part on the previous behavior of the user 102 or other users 102. As described above, the points of interest 208 may be determined by evaluating the transport control data 118 with one or more of probability distributions, heuristics, machine learning techniques, and so forth. In one implementation, the heuristics may involve analyzing time between subsequent navigation inputs. For example, a first point which the user 102 navigates to, and then within a pre-determined time threshold such as five seconds navigates to another point, may be given a lower rank or weight than a second point which the user 102 navigates to and then provides no further navigation input until more than five seconds later.

In some implementations the user interface 200 may provide previews 210 such as thumbnail images or audio snippets for the points of interest 208. These previews 210 may provide the user 102 with an indication as to what is in the content 112 at those various times.

As described above, the pre-fetch data 120 may include a pre-fetch timeline 122. In some implementations the pre-fetch timeline 122 may be delivered from the content server 128 to the media device 104. The pre-fetch timeline 122 may then be used to populate the timeline 204 presented in the user interface 200. The pre-fetch timeline is discussed in more detail below with regard to FIGS. 3 and 4.

The pre-fetch content 124 may comprise of clips 212 or segments which are associated with the content 112. The pre-fetch content 124 may be delivered incrementally. For example, a first portion of the pre-fetch content 124(1) may be delivered while the current position in the content 206 is at a first time. A second portion of the pre-fetch content 124(2) may be delivered when the current position in the content 206 is at a second time different from the first, such as two minutes later. For example, as illustrated here, the pre-fetch content 124(1) for a first portion associated with the first two points of interest 208 includes the clips 212(1)-212(2) for that portion.

The pre-fetch content 124 may be based in part on the content 112, or may be otherwise associated with the content 112. In one implementation the pre-fetch content 124 may be a copy of the corresponding portion of the content 112. In another implementation the pre-fetch content 124 may be a lower resolution rendition of the content 112, such as a transcoded "standard definition" version derived from the "high definition" content 112.

The duration of the clips 212 may be fixed, such as two seconds for all clips 212, or may be variable. In some implementations the variability of the duration of the clips may be associated with, or based at least in part on, network conditions or other factors. For example, during a period of peak network usage when network throughput may be decreased, the duration of the clip 212(1) may be extended to four seconds, allowing additional time for the content 112 to be streamed. Likewise, during a period of low network usage when network throughput is increased, the duration of the clip 212(1) may be reduced to 1 second.

Figure 3:
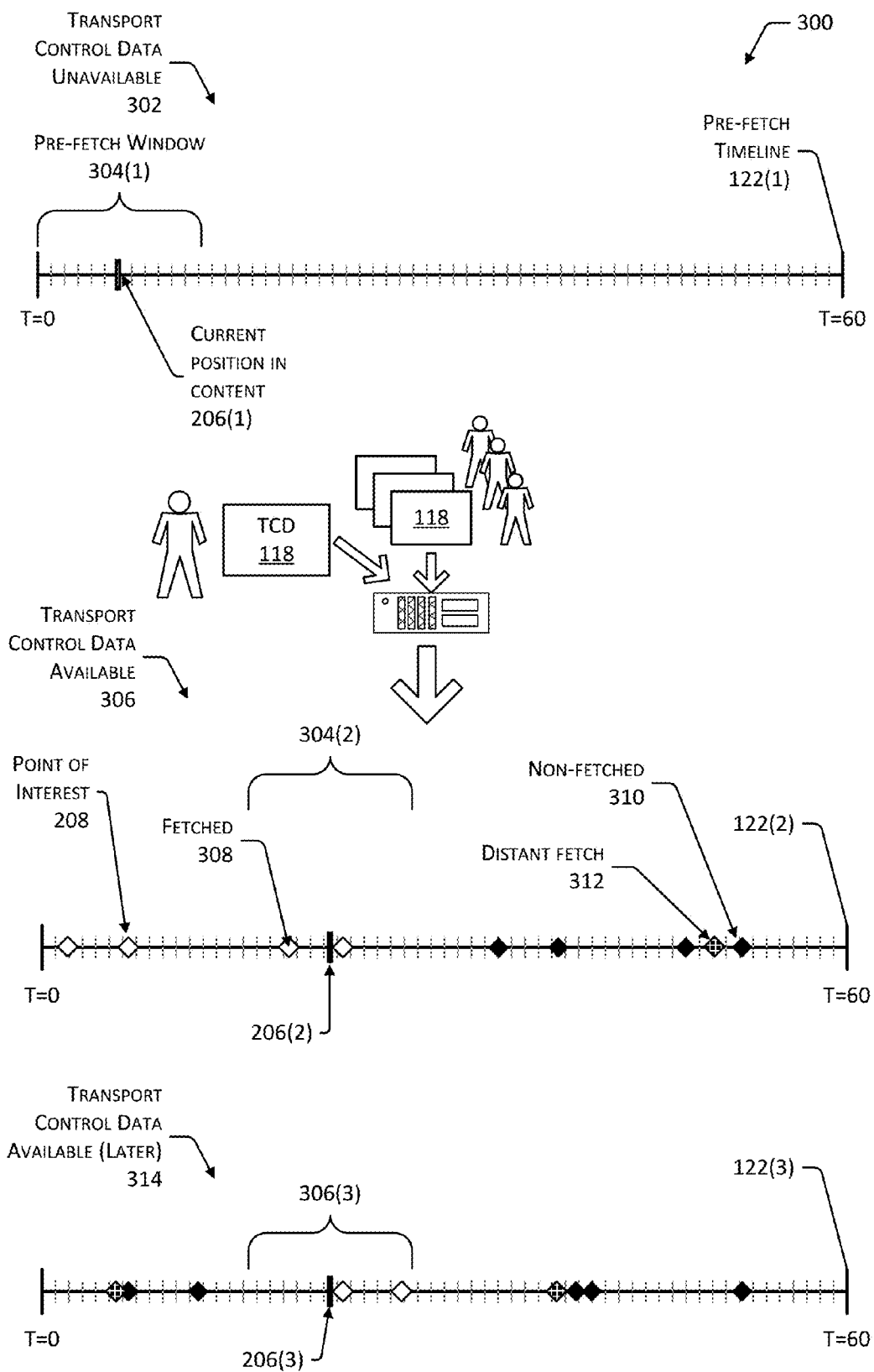
FIG. 3 illustrates details of a pre-fetch timeline associated with the content which is based at least in part on transport control data input from a plurality of users.

FIG. 3 illustrates details 300 of several pre-fetch timelines 122. As described above, the pre-fetch timelines 122 may be generated based at least in part on the transport control data 118 received from the plurality of users 102 consuming the content 112.

A first pre-fetch timeline 122(1) is indicated when transport control data is unavailable 302. For example, upon the first presentation of the content 112. The current position in the content 206 is indicated as described above. Without the pre-fetch timeline 122(1), no points of interest 208 are available. A pre-fetch window 304(1) is depicted which tracks with the current position in the content 206(1). The points of interest 208 which are within the pre-fetch window 304 may be retrieved from the content server 128. The pre-fetch window 304 may be arranged symmetrically relative to the current position in the content 206, or may be asymmetrical. For example, an asymmetrical pre-fetch window 304 may be configured to extend from 2 minutes before the current position in the content 206 to 6 minutes after.

In comparison, when transport control data is available 306, the pre-fetch timeline 122(2) now includes several points of interest 208. The points of interest 208 may be based at least in part on the user input resulting in the transport control data 118. As illustrated here, the current position in the content 206(2) has progressed along the timeline 204, and the pre-fetch window 304(2) has tracked along with this progression. In addition to the pre-fetch timeline 122, the pre-fetch content 124 may also be updated based at least in part on a current position 206 in the stream of the content 112.

In this illustration, fetched content 308 is indicated with a white diamond. The fetched content 308 comprises the pre-fetch content 124 which has been transferred to the media device 104 and is ready for presentation. As indicated here, the pre-fetch content 124 associated with two points of interest 208 have been fetched and are available. Here, those points of interest 208 which are earlier in time and have been previously fetched are also available.

Non-fetched 310 points of interest 208 which are outside the pre-fetch window 304 and have not yet been stored on the media device 104 are indicated with solid black diamonds. Also depicted are distant fetch 312 points of interest 208, indicated with a crosshatch pattern. In some implementations, the pre-fetch content 124 associated with points of interest 208 outside the current pre-fetch window 304 may be retrieved as the distant fetch 312. The distant fetch 312 points of interest 208 may be those points which are of such high probability of being accessed that they are provided to the media device 104. For example, the distant fetch 312 point of interest 208 may be a particularly exciting play in a sporting event or a commonly referred to scene in a movie. The distant fetches 312 may thus improve responsiveness to the user 102 when navigating outside the pre-fetch window 304.

The pre-fetch timelines 122 may dynamically change with time. Over time, how users 102 interact with the content 112 may vary. For example, as times and personal tastes change users may become more interested in different portions of the content 112. These changes may be over short time intervals such as seconds or longer periods such as years. Transport control data available later 314 in time is depicted in this illustration. For example, several years later the number and distribution of the points of interest 208 have shifted. Some points of interest 208 have been added while others have been removed. In another example, the number and distribution of the points of interest 208 may change as the user 102 looks at the timeline 204 in the user interface 200. The pre-fetch timelines 122 may also vary based on the profiles 136, which are discussed next with regard to FIG. 4.

Figure 4:
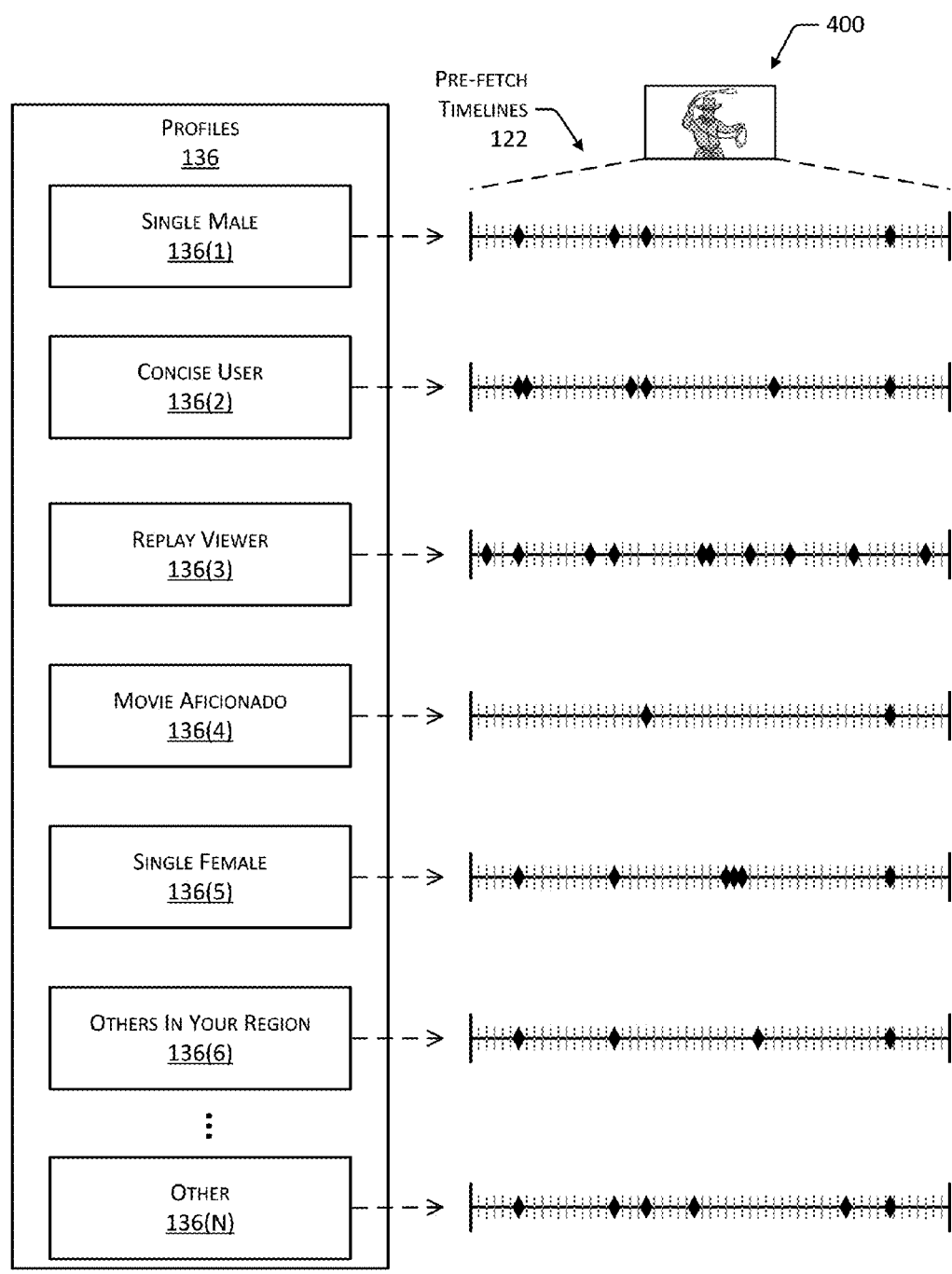
FIG. 4 illustrates different profiles which may be used to generate different pre-fetch timelines for the same piece of content.

FIG. 4 illustrates variations 400 between pre-fetch timelines 122 which have been generated by different evaluations of the transport control data 118 specified at least in part by one or more of the profiles 136. The profiles 136 may be used to customize or tailor the pre-fetch data 120 to particular users 102 or groups of users. This customization may include filtering data to users 102 with the same or similar demographics, user preferences for content 112 deliveries, changes to the probability distribution, and so forth.

The transport control data analysis module 134 may be configured to compare users 102 with the same or similar demographics, usage patterns, preferences, and so forth to generate particular profiles. In the illustration shown here, profiles 136 are available for a single male 136(1), concise user 136(2), replay viewer 136(3), movie aficionado 136(4), single female 136(5), and others in your region 136(6). The points of interest 208 in each of these profiles differ from one another. For example, the concise user profile 136(2) may be a person who tends to fast forward through content looking for interesting portions, in effect "skimming" the content 112. As illustrated here, the pre-fetch timeline 122 associated with this profile contains several points of interest 208 which are distributed throughout the content 112. In comparison, the movie aficionado profile 136(4) has fewer points of interest because the transport control data 118 for the users 102 associated with this profile tend to watch the content 112 linearly and continuously.

The profiles 136 associated with a particular user 102 may be manually or automatically selected. For example, the user interface module 108 of the media device 104 may be configured to present a series of questions to the user 102. Inputs to these questions may then be used to select the profile 136. In another implementation, the profile selection may occur automatically.

Figure 5:
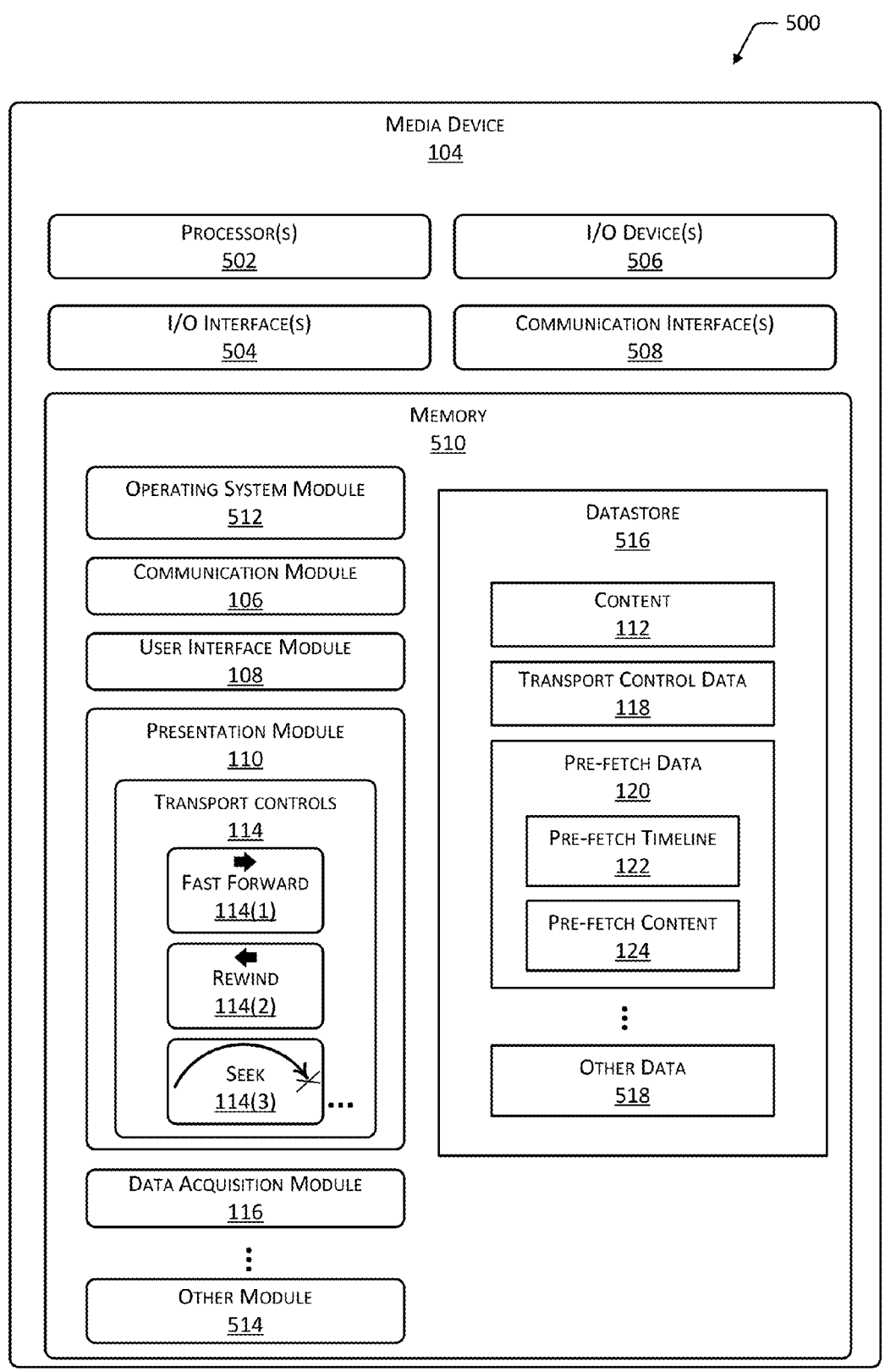
FIG. 5 illustrates a block diagram of a media device configured to acquire the transport control data and use the pre-fetched data to reduce or eliminate latency in presentation of content after user navigation within the content.

FIG. 5 illustrates a block diagram 500 of the media device 104. As described above, the media device 104 may be configured to acquire the transport control data 118 and use the pre-fetched data 120 to reduce or eliminate latency in presentation of content 112 after user navigation within the content 112.

The media device 104 may include one or more processors 502 configured to execute one or more stored instructions. The processors 502 may comprise one or more cores. The media device 104 may include one or more input/output ("I/O") interface(s) 504 to allow the processor or other portions of the media device 104 to communicate with other devices. The I/O interfaces 504 may comprise inter-integrated circuit ("I2C"), serial peripheral interface bus ("SPI"), USB, RS-232, a media device interface such as HDMI®, and so forth.

The I/O interface(s) 504 may couple to one or more I/O devices 506. The I/O devices 506 may include input devices such as one or more of a camera, a microphone, a touch sensor, a button, and so forth. The I/O devices 506 may also include output devices such as one or more of a display, audio speakers, haptic output device and so forth. In some embodiments, the I/O devices 506 may be physically incorporated with the media device 104 or may be externally placed.

The I/O interfaces 504 may include one or more media device interfaces. The media device interfaces allow for the exchange of information between the media device 104 and other media devices 104. The media device interface may include one or more of a HDMI®, TOSLINK®, Ethernet, analog video, analog audio, IEEE 1394, USB, Bluetooth®, ZigBee®, and so forth. The device interfaces may allow for wired or wireless communication between the media device 104 and the other media devices 104.

The media device 104 may also include one or more communication interfaces 508. The communication interfaces 508 are configured to provide communications between the media device 104 and other devices. The communication interfaces 508 may include personal area networks, wireless local area networks, wireless wide area networks, and so forth. The media device 104 may communicate with the remote control using one or more of the communication interfaces. For example, the media device 104 may communicate with the remote control using a Bluetooth® personal area network.

The media device 104 may also include one or more busses or other internal communications hardware or software that allow for the transfer of data between the various modules and components of the media device 104.

As shown in FIG. 5, the media device 104 includes one or more memories 510. The memory 510 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 510 provides storage of computer readable instructions, data structures, program modules and other data for the operation of the media device 104.

The memory 510 may include at least one operating system (OS) module 512. The OS module 512 is configured to manage hardware resource devices such as the I/O interfaces 504, the I/O devices 506, the communication interfaces 508, the device interfaces, and provide various services to applications or modules executing on the processors 502. Also stored in the memory 510 may be the communication module 106, the user interface module 108, the presentation module 110, and the data acquisition module 116.

As described above, the communication module 106 is configured to establish and support communications between the media device 104 other devices. The communication module 106 may access the communication interfaces 508 to exchange information. For example, the communication module 106 may be configured to request content 112 from the content server 128 using the network 126.

As described above, the user interface module 108 is configured to provide the user interface to the user 102 using the I/O devices 506 and accept inputs received from the user input I/O devices 506. The user interface may include one or more visual, audible, or haptic elements. For example, the user interface may be configured to provide a visual user interface 200 as described above allowing navigation within the content 112.

The presentation module 110 is configured to present content 112 on the media device 104 or another device, such as a television connection using HDMI®. The presentation module 110 is configured to receive content 112 streamed from an external source device such as the content server 128, or may access content 112 which has been previously stored on the media device 104 in the memory 510, such as the pre-fetch content 124. The presentation module 110 may support digital rights management, presentation of encrypted content, and so forth.

The presentation module 110 is configured to be responsive to the one or more transport controls 114. As described above, the transport controls 114 are configured such that, when activated, presentation of the content 112 may be shifted to a different point in time in the content 112. In the example illustrated here, the transport controls include a fast forward 114(1) control, a rewind 114(2) control, and a seek control 114(3). In other implementations other transport controls may be provided such as scrubbing, jumping, and so forth. These controls may be implemented as physical buttons, such as on the remote control device, virtual or "soft" buttons or features presented in the user interface such as provided by the user interface module 108, verbal commands recognized by a machine such as using speech recognition, gestures received by a camera, and so forth.

The data acquisition module 116 on the media device 104 is configured to acquire at least a portion of the transport control data 118 used by the transport control data analysis module 134 of the content server 128. The data acquisition module 116 may work in conjunction with other modules, such as the communication module 106, the user interface module 108, and the presentation module 110. In some implementations the data acquisition module 116 may access system or user logs and use the information therein to generate at least a portion of the transport control data 118.

The data acquisition module 116 may be configured to use the user interface module 108 to provide a user interface to the user 102 which allows for the specification of preferences, indication of whether to allow or disallow collection of the transport control data 118, and so forth. For example, the user 102 may choose to opt-in to collection and sharing of the transmission control data 118 with the content server 128.

Other modules 514 may be stored in the memory 510. For example, a digital rights management module may work in conjunction with the presentation module 110 to facilitate access to content.

The memory 510 may also include a datastore 516 to store information. The datastore 516 may use a flat file, database, linked list, tree, or other data structure to store the information. In some implementations, the datastore 516 or a portion of the datastore 516 may be distributed across one or more other devices including servers, network attached storage devices and so forth.

The datastore 516 may store a portion of the content 112, such that that which is being buffered. The datastore 516 may also store the transport control data 118 prior to transmission to the content server 128 or another device such as a data aggregation server. The pre-fetch data 120 may also be stored in the datastore 516. Other data 518 may also be stored, such as user preferences, account login information, and so forth.

Figure 6:
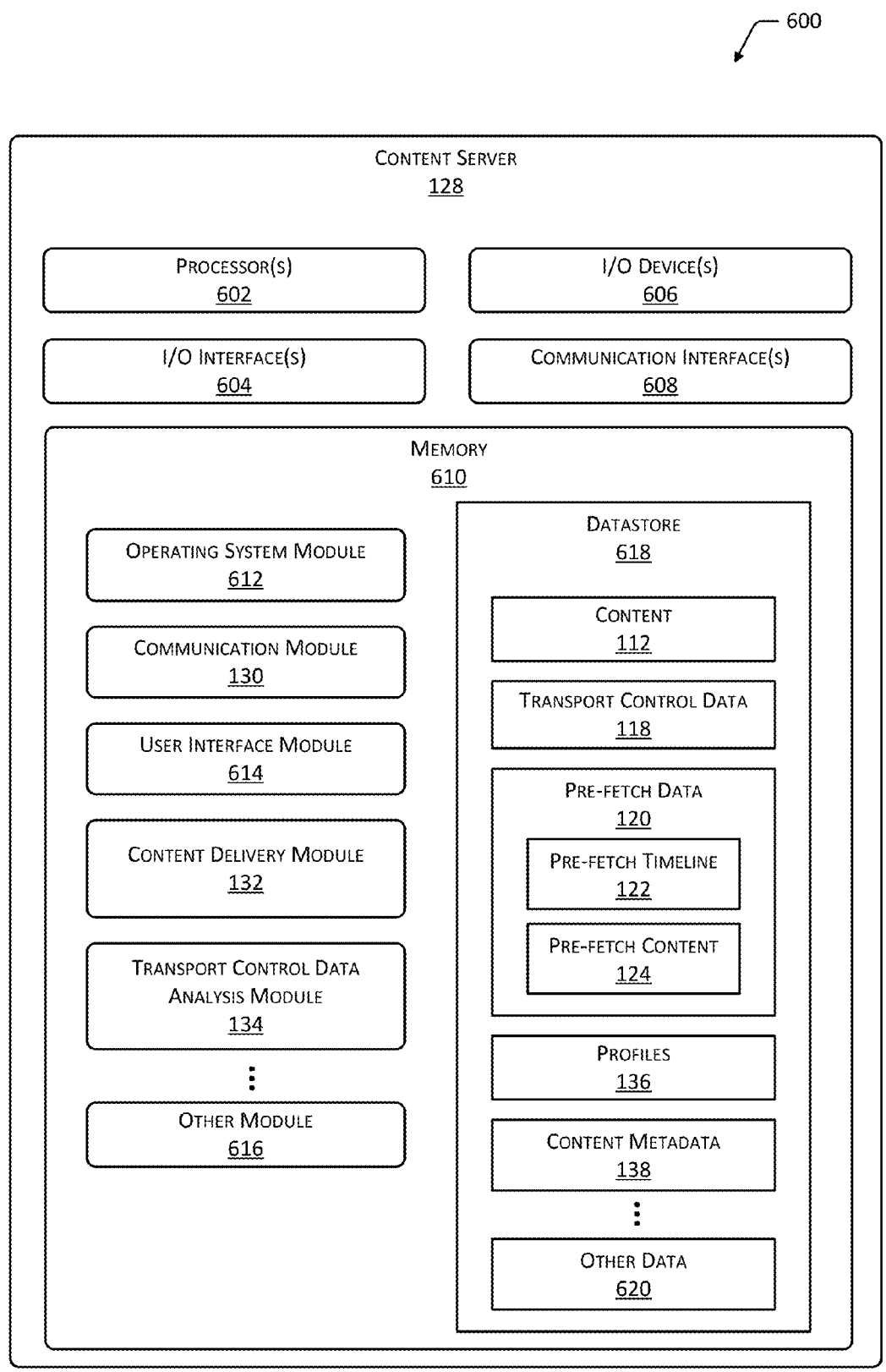
FIG. 6 illustrates a block diagram of a content server configured to process the transport control data to generate pre-fetch data which may then be distributed to the media devices.

FIG. 6 illustrates a block diagram 600 of the content server 128 configured to process the transport control data 118. The functions associated with the content server 128 described in this disclosure may be implemented as one or more servers, and by one or more entities. For example, in one implementation one server may provide and distribute the content 112 while another hosts the transport control data analysis module 134. The one or more servers may be physical server devices or virtual servers executing on physical server devices.

The content server 128 may include one or more processors 602 configured to execute one or more stored instructions. The processors 602 may comprise one or more cores. The content server 128 may include one or more I/O interface(s) 604 to allow the processor or other portions of the content server 128 to communicate with other devices. The I/O interfaces 604 may comprise I2C, SPI, USB, RS-232, and so forth.

The I/O interface(s) 604 may couple to one or more I/O devices 606. The I/O devices 606 may include input devices such as one or more of a keyboard, a touch sensor, and so forth. The I/O devices 606 may also include output devices such as one or more of a display, printer, and so forth. In some embodiments, the I/O devices 606 may be physically incorporated with the content server 128 or may be externally placed.

The content server 128 may also include one or more communication interfaces 608. The communication interfaces 608 are configured to provide communications between the content server 128 and other devices such as the media device 104. The communication interfaces 608 may include wireless local area networks, wireless wide area networks, and so forth. For example, the communication interfaces 608 may include an Ethernet interface which connects to the network 126.

The content server 128 may also include one or more busses or other internal communications hardware or software that allow for the transfer of data between the various modules and components of the content server 128.

As shown in FIG. 6, the content server 128 includes one or more memories 610. The memory 610 comprises one or more CRSM. The memory 610 provides storage of computer readable instructions, data structures, program modules and other data for the operation of the content server 128.

The memory 610 may include at least one operating system (OS) module 612. The OS module 612 is configured to manage hardware resource devices such as the I/O interfaces 604, the I/O devices 606, the communication interfaces 608, the device interfaces, and provide various services to applications or modules executing on the processors 602. Also stored in the memory 610 may be a user interface module 614, the content delivery module 132, and the transport control data analysis module 134.

The user interface module 614 is configured to provide a user interface to the user 102 or to the media device 104. In one implementation, the user interface may be a web interface presented via the network 126 and accessible to the users 102. In another implementation the user interface may comprise an application programming interface ("API") which enables communication such as sending requests for pre-fetch data 120 from the media device 104 to the content server 128.

The user interface module 614 may also be configured to accept data from the users 102 or the media devices 104, including but not limited to the transport control data 118. In one implementation the user interface module 614 may be configured to provide an interface to the media device 104 to allow for the exchange of the transport control data 118.

As described above, the content delivery module 132 is configured to stream the content 112 to one or more of the media devices 104. The streaming of the content 112 may be initiated by a request from the media device 104, or by the content server 128 or another device. For example, in some implementations the user 102 may use a third device to initiate streaming from the content server 128 and presentation on the media device 104(1).

The transport control data analysis module 134 is configured to access the transport control data 118 provided from a plurality of media devices 104. The content server 128 may directly acquire this information, such as receiving it from the plurality of the media devices 104, or may receive the data from another device such as an aggregation server.

In some implementations the transport control data analysis module 134 may acquire the transport control data 118 at least in part from interactions between the media device 104 and the content server 128. In these implementations, transport control data 118 may be acquired without interaction with the data acquisition module 116. For example, the content server 128 may log data indicating when the stream of the content 112 deviates from linear playback and is resumed at a different point in the content 112. This log data may then be used to generate the transport control data 118, such as the content identifier 118(1) and the location identifier 118(2) data.

The transport control data analysis module 134 may be configured to generate the pre-fetch data 120 based at least in part on the transport control data 118, content metadata 138, or other information. The transport control data 118, content metadata 138, or other information may be processed to determine one or more points of interest 208. For example, content 112 which has been newly added and for which no transport control data 118 has been acquired may have points of interest 208 and the pre-fetch timeline 122 determined based on the content metadata 138.

The transport control data analysis module 134 may evaluate the transport control data 118 using one or more of probability distributions, heuristics, machine learning techniques, and so forth. For example, the data from thousands of users 102 may be analyzed to determine a top 20% of the most popular points of interest 208 in the content 112. These points of interest 208 may then be used to generate the pre-fetch timeline 122.

Other modules 616 may be stored in the memory 610. For example, a content metadata generation module may be configured to generate the content metadata 138 as described above.

The memory 610 may also include a datastore 618 to store information. The datastore 618 may use a flat file, database, linked list, tree, or other data structure to store the information. In some implementations, the datastore 618 or a portion of the datastore 618 may be distributed across one or more other devices including servers, network attached storage devices and so forth.

The datastore 618 may store the content 112 for distribution, the transport control data 118, the pre-fetch data 120, the profiles 136, the content metadata 138, or other data 620. For example, the other data 620 may include administrator preferences, account information associated with the user 102, and so forth.

Illustrative Processes

Figure 7:
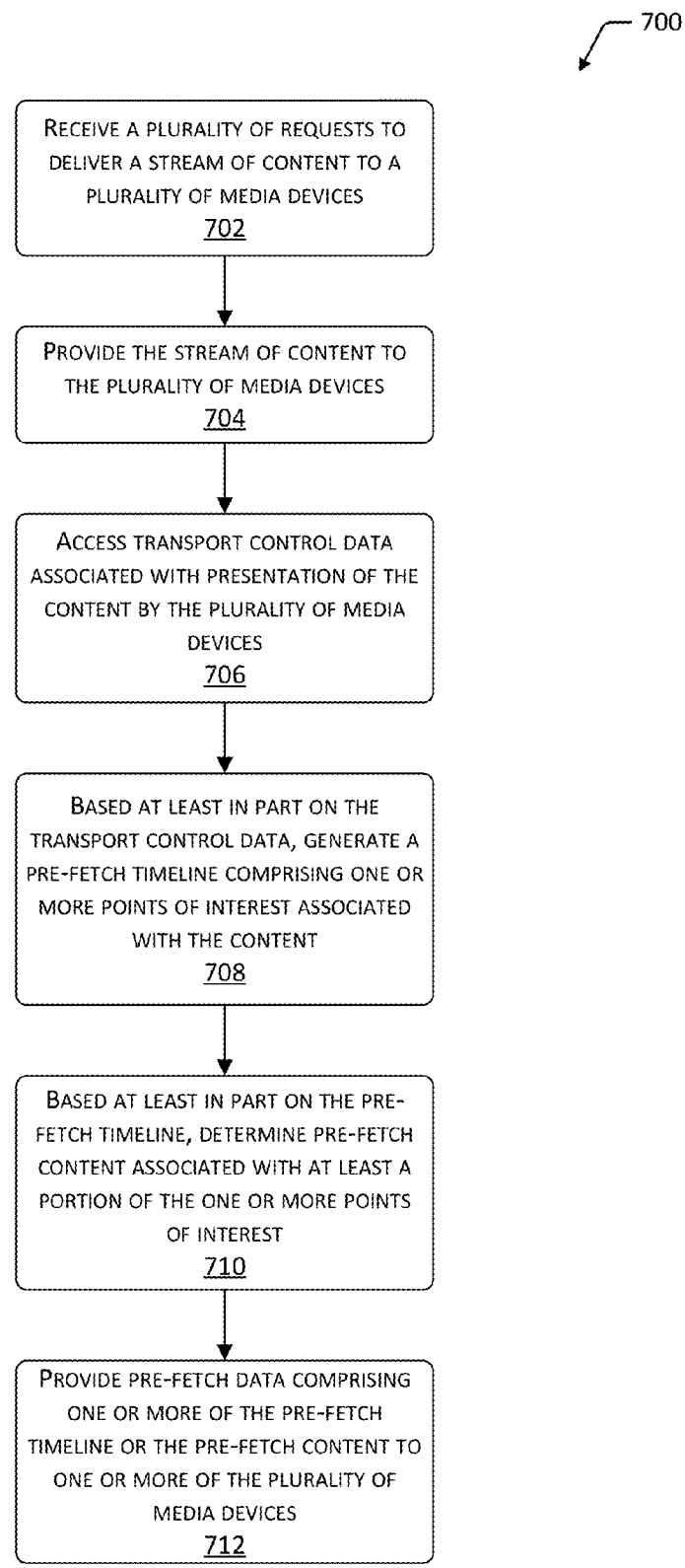
FIG. 7 is a flow diagram of a process of providing pre-fetch data based on transport control data to the media devices.

FIG. 7 is a flow diagram 700 of a process of providing pre-fetch data 120 based on the transport control data 118. In some implementations this process may be provided by the content server 128.

Block 702 receives a plurality of requests to deliver streams of content 112 to a plurality of media devices 104. For example, the content server 128 may receive requests to send the content 112 to the media devices 104(1)-(727). These requests may be associated with a single user 102, or with a plurality of the users 102.

Block 704 provides the streams of content 112 to the requesting media devices 104. Continuing the example, the stream of the content 112 may be sent to the media devices 104(1)-(727) using the network 126.

Block 706 accesses transport control data 118 associated with presentation of the content 112 delivered from one or more content servers 128 by streaming to a plurality of media devices 104. As described above, the transport control data 118 may be information indicative of navigation to one or more points in time between a beginning time and an ending time of the content 112. For example, the transport control data 118 may include the location identifier data 118(2) indicating the user 102 has navigated to time 17:27 in the content 112. The transport control data 118 may include one or more of the content identifier data 118(1) which is indicative of the particular piece of content 112 being streamed, the location identifier data 118(2) indicating a particular point within the content 112, or the user input control used 118(3) to accept the navigation input such as whether the user pressed the remote control or used a spoken command.

The navigation to the one or more points comprises user input configured to rewind presentation of the content 112, fast forward presentation of the content, or seek a particular point in presentation of the content 112. For example, the user 102 may activate the seek transport control 114(3) to go to a particular point in time in the content 112. The transport control data 118 may be associated with a single user 102, or with a plurality of the users 102.

Pre-fetch data 120 associated with the content 112 may be determined based at least in part on the transport control data 118. Based at least in part on the transport control data 118, block 708 generates a pre-fetch timeline 122 comprising one or more points of interest 208 associated with the content 112. As described above, the one or more points of interest 208 may comprise information indicative of the navigation to the one or more points in time between the beginning time and the ending time of the content 112. For example, the pre-fetch timeline 122 may include several points such as described above with regard to FIG. 3.

In some implementations, the determination of the pre-fetch data 120 may use one or more different techniques. One technique involves a block (not pictured) which applies a probability distribution to a portion of the plurality of points in the transport control data 118. For example, a Gaussian distribution may be applied to the points in particular portion or time slices. For example, portions may be designated at every 5 seconds in the content 112. Probability distributions may then be generated for each of these portions. Another block designates, as a point of interest 208, the point of the portion having the greatest probability. The pre-fetch data 120 may then include the pre-fetch timeline 122 based on the designated points of interest 208 for different portions of the content 112.

In another implementation, either alone or in conjunction with the probability distribution, one technique for the determination of the pre-fetch data 120 may include evaluating the plurality of points in the transport control data 118 with one or more heuristics to designate the points of interest 208 within the portion of the content 112.

As described above with regard to FIG. 4, profiles 136 may be used to determine the pre-fetch data 120. In one implementation, one or more profiles 136 associated with a user 102 may be determined. The selection of the probability distribution or heuristics may then be based at least in part on the one or more profiles 136.

Based at least in part on the pre-fetch timeline 122, block 710 determines pre-fetch content 124 associated with the one or more points of interest 208. As described above with respect to FIG. 2, the pre-fetch content 124 may comprise one or more clips 212 of the content 112 associated with the one or more points of interest 208. The clips 212 may comprise audio, video, or both.

In some implementations the content 112 as streamed comprises a first resolution and the clips 212 comprise a second resolution, lower than the first resolution. For example, the content 112 may be streamed at 1080p resolution, while the clips 212 are provided at 480p resolution.

Block 712 provides the pre-fetch data 120 to the one or more of the plurality of media devices 104. This may include sending the pre-fetch timeline 122, the pre-fetch content 124, or both using the network 126. In one implementation the pre-fetched content 124 may be sent, and the presentation module 110 of the media device 104 may be configured to use this information when the user activates one or more of the transport controls 114. In another implementation, the pre-fetch timeline 122 may be sent to the media devices 104, which may then use the information in the pre-fetch timelines 122 to request particular portions of the pre-fetch content 124.

Figure 8:
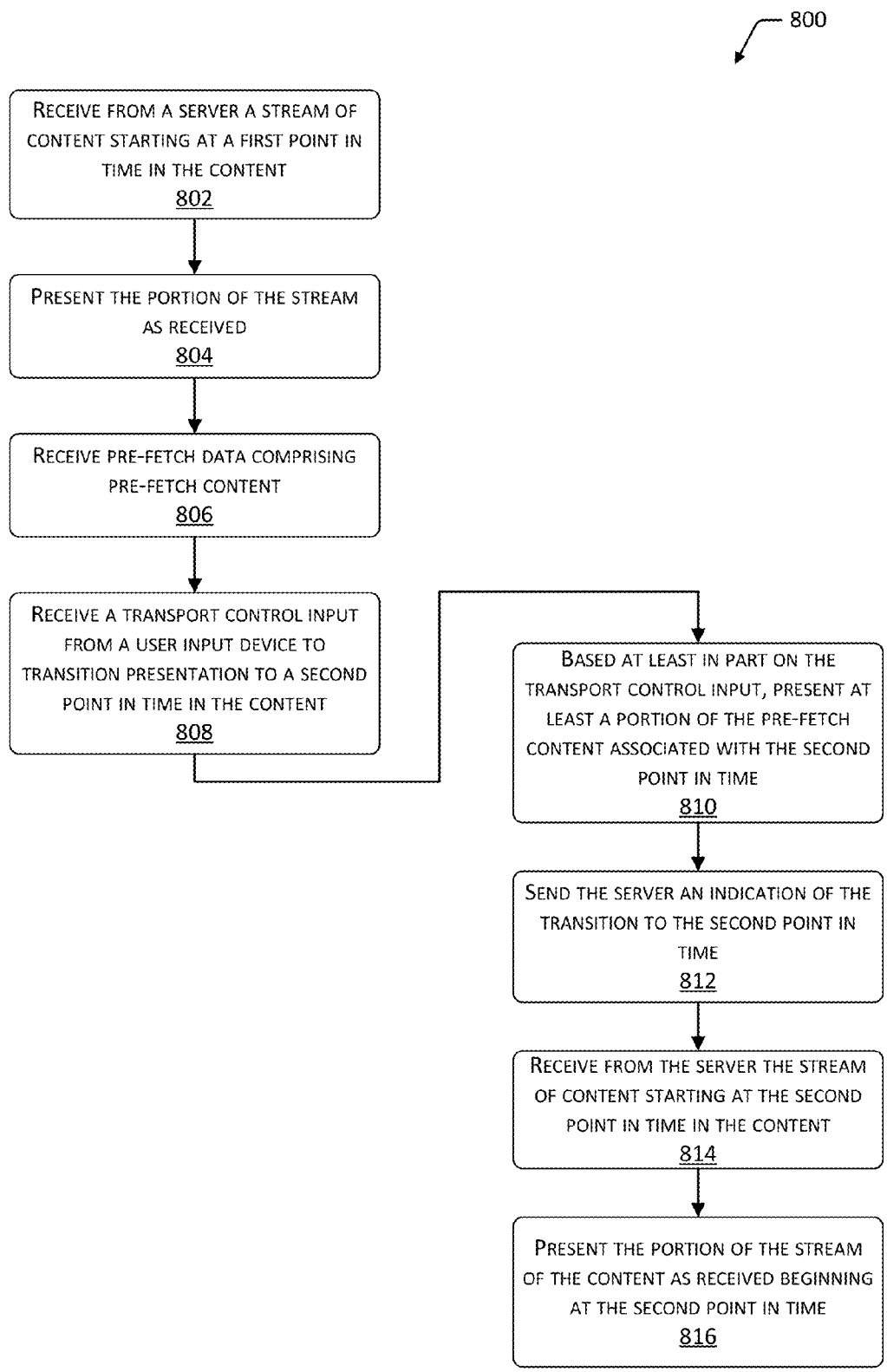
FIG. 8 is a flow diagram of a process of using pre-fetch data to reduce or eliminate latency.

FIG. 8 is a flow diagram 800 of a process of using the pre-fetch data 120 to reduce or eliminate latency. This process may be implemented by the media device 104.

Block 802 receives from the server 128 a stream of content 112 starting at a first point in time in the content 112. As described above, the stream comprises an incremental ongoing transmission of portions of the content 112 over the network 126. The first point in time in the content 112 may be at a beginning of the content 112, or at another point within the content 112.

Block 804 presents the portion of the stream of the content 112 as received beginning at the first point in time. For example, once DRM setup and buffering has completed, the media device 104 may begin to present the audio and video of the content 112.

Block 806 receives pre-fetch data 120 associated with the content 112. As described above, in one implementation the pre-fetch data 120 may be based at least in part on transport control data 118 which is descriptive of a plurality of transport control inputs received from a plurality of users 102 accessing the content 112. As described above, the transport control data 118 comprises user activation of one or more transport controls 114 configured to fast forward presentation of the content 114(1), rewind presentation of the content 114(2), or seek a particular point in presentation of the content 114(3).

In one implementation, the pre-fetch data 120 may comprise a pre-fetch timeline 122 of a plurality of points of interest 208. The pre-fetch timeline 122 configured for presentation by the user interface module 108 to the user 102. The transport control data 118 may comprise user input to select one of the points of interest 208 of the pre-fetch timeline 122.

The pre-fetch data 120 as described above comprises a plurality of points of interest 208 within the content 112. These points of interest 208 are determined based at least in part on input from a plurality of users 102. The pre-fetch data 120 may also include pre-fetch content 124 comprising a plurality of clips 212 associated with at least a portion of the plurality of points of interest 208.

In another implementation, the pre-fetch data 120 may be based at least in part on one or more pieces of content metadata 138 associated with the content 112. As described above, the content metadata 138 is indicative of one or more events at particular points in the content 112. The one or more events may include spoken words stored in the content 112, printed words displayed in the content 112, faces appearing in the content 112, objects appearing in the content 112, objects heard in the content 112, and so forth. For example, the content metadata 138 may include information about what times in the content 112 a particular character appears. The pre-fetch content 124 may be provided which comprises one or more particular events in the content 112. For example, the pre-fetch content 124 may include clips 212 associated with a particular actor.

The pre-fetch data 120 as received may be associated with a presentation point in the presentation of a portion of the stream of the content 112 such that, as the presentation point changes the pre-fetch data 120 received changes. For example, as described above with regard to FIG. 3, the pre-fetch window 304 may move along with the current position in the content 206.

Block 808 receives transport control data 118 associated with one or more transport control 114 inputs from a user input device such as one of the I/O devices 506 described above. These transport control 114 inputs are associated with a transition of presentation of the content 112 from the first point in time to a second point in time in the content 112. For example, the user 102 may press the fast forward transport control 114(1) to move presentation forward in the content 112 from the current position of 13:17 to 14:21.

Based at least in part on the transport control data 118, block 810 presents at least a portion of the pre-fetch data 120 associated with the second point in time. Presentation of the at least a portion of the pre-fetch data 120 may comprise presenting one of the plurality of clips 212. For example, the pre-fetch content 124 associated with 14:21 or which leads up to 14:21 may be played. The portion of the pre-fetch data 120 associated with the second point in time may comprise a clip 212 configured to conclude presentation at the second point in time. For example, the pre-fetch data 124 may lead up to the point of interest 208.

Block 812 sends the server 128 an indication of the transition of presentation to the second point in time. For example, the media device 104 may use the network 126 to send information describing the transition of presentation to point 14:31 in the content 112 to the content server 128.

Block 814 receives from the server 128 the stream of content 112 starting at the second point in time in the content 112. Continuing the example, the server 128, responsive to the request, begins sending the content 112 stream associated with the point 14:31.

Block 816 presents the portion of the stream of the content 112 as received beginning at the second point in time. This presentation continues until the end of the content 112 is reached, the user 102 activates one of the transport controls 114, and so forth. The presentation to the user 102 may be configured to transition from the pre-fetch content 124 to the portion of the stream of the content 112 such that presentation is seamless.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system, comprising:
  at least one memory storing computer-executable instructions; and
  at least one processor configured to access the at least one memory and execute the computer-executable instructions to:
    receive a request from one or more of a plurality of media devices to stream first content;

stream the first content to the one or more of the plurality of media devices;

access transport control data acquired by one or more servers during delivery of the first content from the one or more servers by streaming at a first resolution to the one or more plurality of media devices, wherein the transport control data comprises information indicative of navigation by a plurality of users of the one or more plurality of media devices to one or more points in time between a beginning time and an ending time of the first content;

based at least in part on the transport control data acquired by the one or more servers, generate a timeline comprising one or more points of interest associated with the first content arranged sequentially by time, wherein the one or more points of interest are indicative of the navigation by the plurality of users to the one or more points in time between the beginning time and the ending time of the first content;

based at least in part on the timeline, determine pre-fetch content associated with the one or more points of interest, wherein the pre-fetch content comprises one or more clips of the first content at the first resolution that are associated with the one or more points of interest, each clip having a duration of at least one second; and send the pre-fetch content to the one or more of the plurality of media devices while streaming the first content.

2. The system of claim 1, further comprising instructions configured to:
send the timeline to one or more of the plurality of media devices;
receive from the one or more of the plurality of media devices a request for the one or more clips;
retrieve the requested one or more clips; and
send the requested one or more clips to the one or more of the plurality of media devices.

3. The system of claim 1, wherein the navigation to the one or more points comprises user input configured to rewind presentation of the first content, fast forward presentation of the first content, or seek a particular point in presentation of the first content.

4. The method of claim 1, further comprising instructions configured to generate a first timeline for a first user of the plurality of users and generate a second timeline for a second user of the plurality of users.

5. A computer-implemented method for utilizing a computerized system, the computer-implemented method comprising:
streaming content to one or more media devices;
accessing transport control data obtained during streaming of the content to the one or more media devices, wherein the transport control data comprises data indicative of navigation by a plurality of users of the one or more media devices to one or more points in time between a beginning time and an ending time of the content;
determining, based at least in part on the transport control data, data comprising a timeline of points of interest and pre-fetch content associated with the points of interest, wherein the points of interest are indicative of the navigation by the plurality of users to the one or more points in time between the beginning time and the ending time of the content; and providing at least a portion of the data comprising the timeline of points of interest and pre-fetch content associated with the points of interest to the one or more media devices during streaming of the content.

6. The method of claim 5, wherein the transport control data comprises one or more of a content identifier indicative of the content, a location identifier within the content, or a user input control used to accept navigation input.

7. The method of claim 5, wherein the pre-fetch content comprises one or more clips associated with the content, the one or more clips comprising audio, video, or both that are at least two seconds in duration.

8. The method of claim 5, the determining comprising:
evaluating at least a portion of the points in time with one or more heuristics analyzing time between subsequent navigation inputs to designate a point of interest within a portion of the content; and
wherein the data comprises one or more points of interest for one or more portions of the content.

9. The method of claim 5, the determining comprising:
evaluating at least a portion of the points in time in the transport control data with a probability distribution;
designating, as a point of interest, a point of the portion of the points in time having the greatest probability; and
wherein the data provided to the one or more media devices comprises one or more points of interest for one or more of the portions.

10. The method of claim 9, the determining further comprising:
determining one or more profiles associated with a user based at least in part on one or more demographics associated with the user, and wherein the one or more profiles are customized to the one or more demographics; and
selecting the probability distribution for evaluating the at least a portion of the points in time based at least in part on the one or more profiles.

11. The method of claim 5, wherein the content delivered by streaming to the plurality of media devices is provided at a first resolution and further wherein the pre-fetch content associated with the points of interest is provided at the first resolution.

12. A computer-implemented method for utilizing a computerized system, the computer-implemented method comprising:
receiving from a server a stream of content starting at a first point in time in the content, wherein the stream comprises portions of the content delivered over time;
presenting the portion of the stream of the content as received, beginning at the first point in time;
receiving pre-fetch content for a plurality of points of interest within the content while also receiving the stream of content, wherein the plurality of points of interest are determined at least in part on input generated from a plurality of users navigating within the content;
receiving a request to navigate to another location within the content from a user input device, the request associated with a transition of presentation of the content to a second point in time within the content;
based at least in part on the request, presenting at least a portion of the pre-fetch content associated with the second point in time;
sending the server an indication of the transition of presentation of the content to the second point in time;
receiving from the server the stream of content starting at the second point in time in the content; and presenting the portion of the stream of the content as received, such that the presentation transitions from the pre-fetch content to the portion of the stream of content as received.

13. The method of claim 12, wherein the pre-fetch content is based at least in part on navigation input received from a plurality of users accessing the content.

14. The method of claim 12, wherein the pre-fetch content comprises one or more pieces of metadata, wherein the metadata is indicative of one or more particular events in the content.

15. The method of claim 14, wherein the one or more events in the content comprise one or more of:
- spoken words stored in the content at a particular point in the content,
- printed words displayed in the content at a particular point in the content,
- faces appearing in the content at a particular point in the content,
- objects appearing in the content at a particular point in the content, or
- objects heard in the content at a particular point in the content.

16. The method of claim 12, wherein the received pre-fetch content is updated based at least in part on a current position within the stream of the content.

17. The method of claim 12, wherein the request comprises information indicative of user selection of one or more commands configured to rewind presentation of the content, fast forward presentation of the content, or seek a particular point in presentation of the content.

18. The method of claim 12, wherein the pre-fetch content further comprises a plurality of clips of at least two seconds in duration that are associated with at least a portion of the plurality of points of interest; and the presentation of the at least a portion of the pre-fetch content comprises presenting one of the plurality of clips.

19. The method of claim 12, further comprising receiving a timeline of a plurality of points of interest configured for presentation, and the request comprises information indicative of a selection of one of the points of interest of the timeline.

20. The method of claim 12, wherein the portion of the pre-fetch content associated with the second point in time comprises a clip configured to conclude presentation at the second point in time.

* * * * *